Sept. 27, 1949.   M. R. HUDSON   2,483,011
ROW MARKING DEVICE FOR TRACTORS
Filed Sept. 24, 1945   2 Sheets-Sheet 1
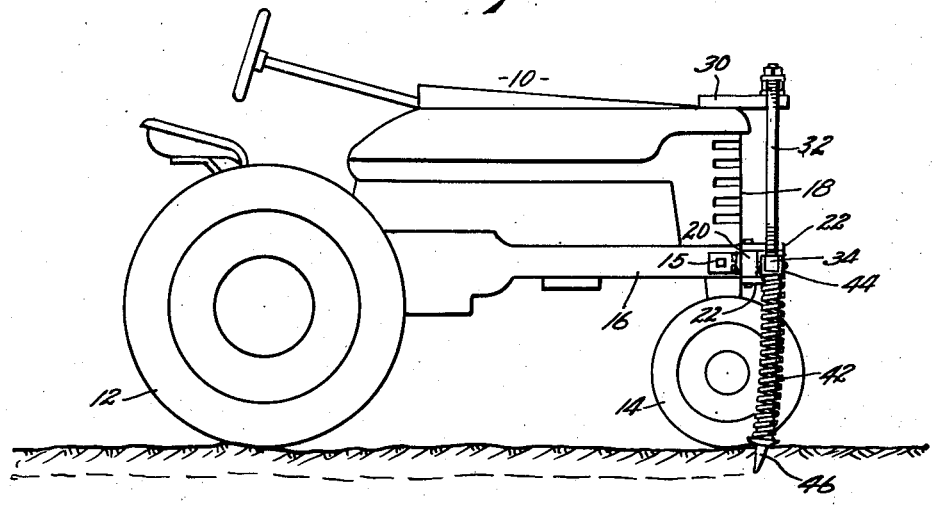
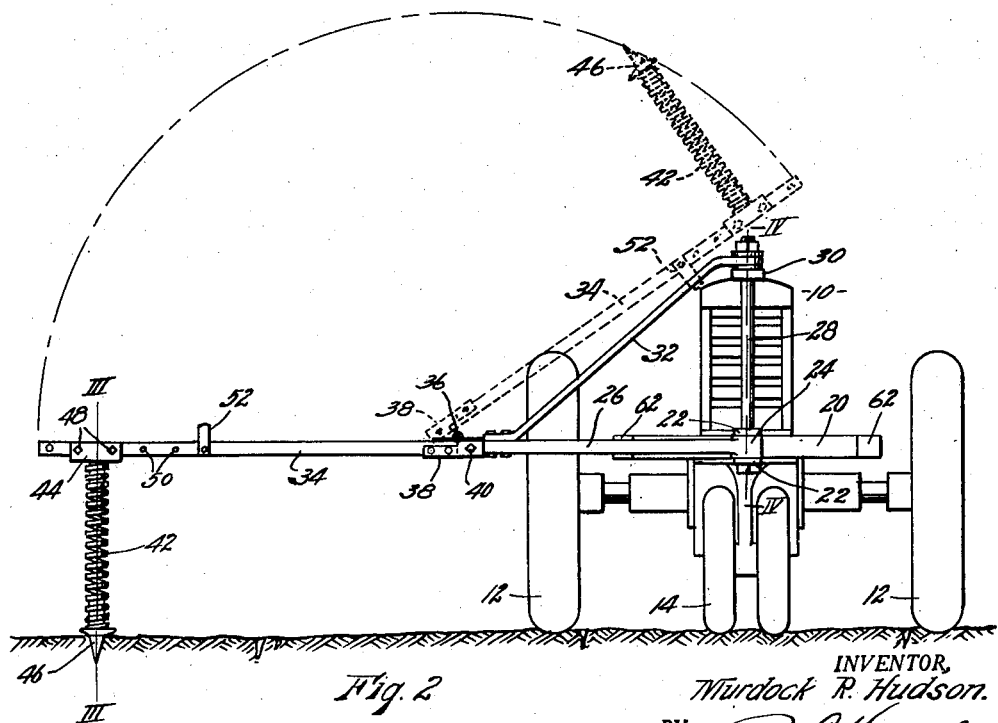
INVENTOR,
Murdock R. Hudson.
BY Roy E. Hamilton,
Attorney.

Sept. 27, 1949.   M. R. HUDSON   2,483,011
ROW MARKING DEVICE FOR TRACTORS
Filed Sept. 24, 1945   2 Sheets-Sheet 2
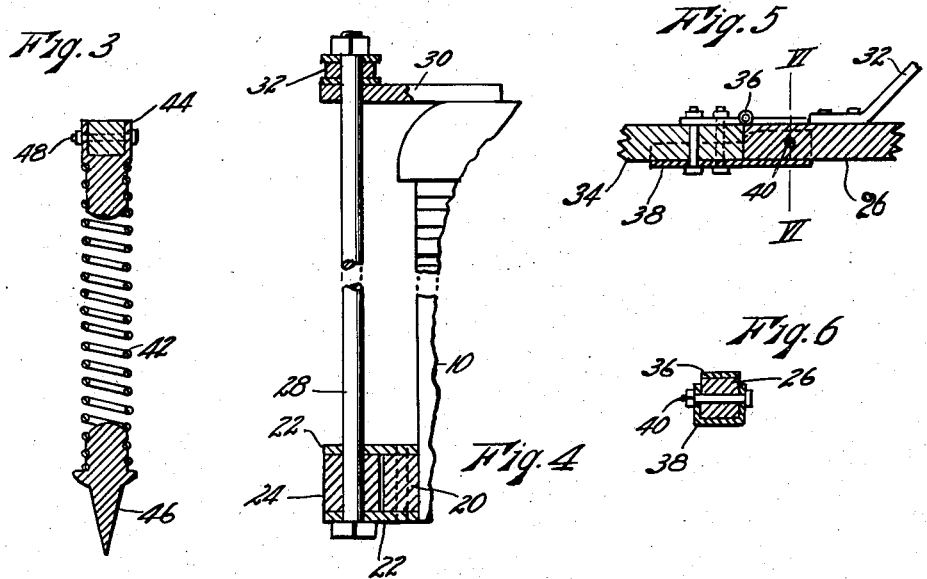
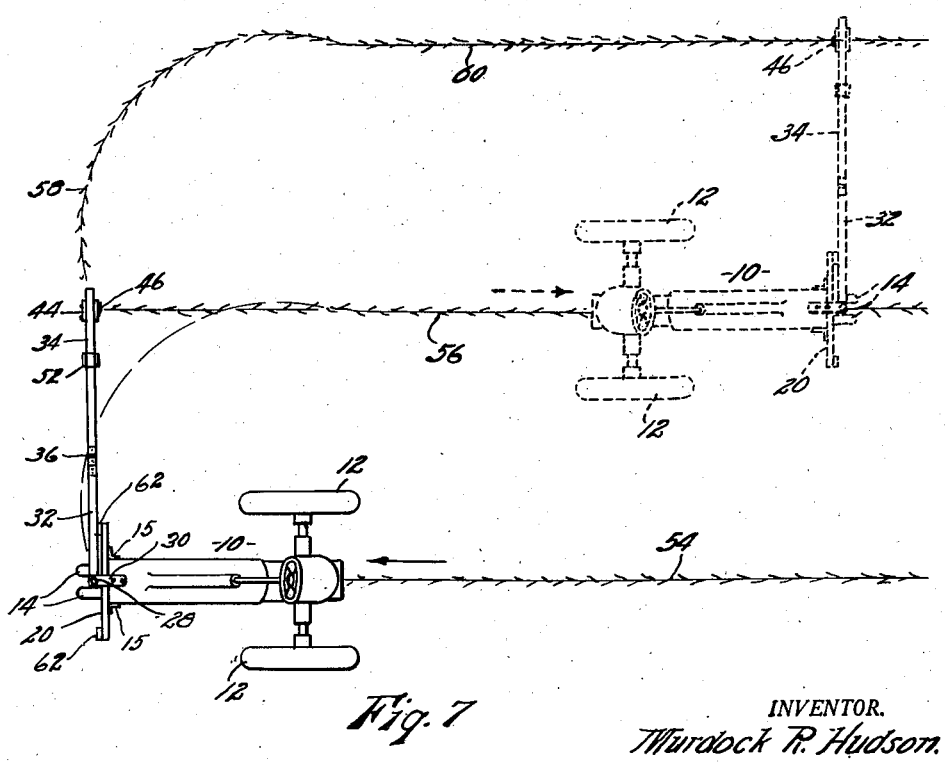
INVENTOR.
Murdock R. Hudson.
BY
Ray E. Hamilton
Attorney.

Patented Sept. 27, 1949

2,483,011

UNITED STATES PATENT OFFICE 2,483,011

ROW MARKING DEVICE FOR TRACTORS

Murdock R. Hudson, Kansas City, Kans.

Application September 24, 1945, Serial No. 618,313

2 Claims. (Cl. 97—230)

This invention relates to improvements in markers adapted to be operatively attached to the front end of a farm tractor used for hauling planting implements across a field.

It has been customary heretofore to use adjustable marking devices for planting implements which require adjustment by the operator in order to maintain the marking device in a fixed direction on the unplanted portion of the field as the tractor is reversed to travel in the opposite direction.

It is the principal object of this invention to provide a marker attached to the forward end of the farm tractor which will automatically be maintained in operative position over the unplanted portion of the field as the direction of travel of the tractor is reversed.

Another object of this invention is the provision of a marker including an arm pivotally mounted on the medial line of the tractor for horizontal oscillatory movement. This arm supports a resilient member which carries a ground engaging point to form a groove or trench in the earth that serves as a guide line for the next row or rows to be planted.

Another object of this invention is the provision of a row marker so constructed and supported by the front end of the farm tractor that as the tractor is turned at the end of the rows to reverse its direction of travel the front tractor wheels will form an arcuate path beneath the marker rod and the marker will be forced outwardly into the unplanted portion of the field to form a suitable guide mark for the tractor when it is reversed at the opposite end of the field.

Other objects are simplicity and economy of construction, ease and flexibility of operation, and adaptability for use on the various types of farm tractors.

With these objects in view as well as other objects which will appear during the course of the specification, reference will be had to the drawings wherein:

Figure 1 is a side view of a farm tractor provided with a row marker embodying this invention.

Fig. 2 is a front view of the tractor with the row marking device shown in the operating position in solid lines and in the inoperative position in dotted lines.

Fig. 3 is an enlarged sectional view taken on line III—III of Figure 2.

Fig. 4 is an enlarged fragmentary sectional view taken on line IV—IV of Figure 2.

Fig. 5 is an enlarged longitudinal sectional view through the hinged joint of the marker arm.

Fig. 6 is a cross sectional view taken on line VI—VI of Figure 5.

Fig. 7 is a diagrammatical view showing a tractor provided with the present marking device showing the path taken by the marker as the tractor is turned at the end of the field.

Throughout the several views like reference characters refer to similar parts and the numeral 10 designates a farm tractor of the wheel type having power wheels 12 and front steering wheels 14 carrying a suitable frame 16. The forward end 18 of the tractor is provided with a cross bar 20 disposed above the steerable wheel 14 and secured by brackets 15 to the tractor frame. This bar carries brackets 22 on the medial line of the tractor and between which is mounted the bearing end 24 of the marker arm 26. A vertically disposed pivot rod 28 extends through brackets 22 and the pivoted head 24 of the marker arm and also projects upwardly through a bearing 30 rigidly attached to the top of the tractor frame. A reinforcing bar 32 is rigidly attached at its lower end to marker arm 26 and pivotally mounted on the upper end on rod 28. This reinforcing rod maintains the marker arm in a normal horizontal position and secures it against sagging. The outer section 34 of marker arm 26 is pivotally connected thereto by hinge 36 to permit vertical oscillatory movement of 34. Means for reinforcing the joint between arms 34 and 26 includes a channel member 38 rigidly attached to marker arm 34 and extending over a portion of arm 26 adjacent the joint between said arms. A bolt 40 is disposed transversely through channel member 38 and the outer end of arm 26 to normally hold arms 34 and 26 in longitudinal alignment.

A flexible marker standard or arm 42 rigidly attached at its one end to a channel bracket 44 carries at its lower extremity a point marker 46 which is preferably symetrical in vertical central section and is adapted to normally penetrate the ground surface to form a groove or channel therein.

It will be noted that channel 44 is provided with bolts 48 by means of which it is rigidly attached to the marker arm 34. These bolts 48 pass through channel 44 and holes 50 formed transversely through marking arm 34 in spaced apart relation to permit of longitudinal adjustment of the marker standard 42 along the marking arm 34 thus permitting of marking suitable for planting equally spaced rows at various distances between the rows.

Marker arm 34 is provided with a bumper block 52 which is adapted to contact the brace bar 32 when the marker arm 34 is moved to the inoperative position as shown in dotted lines in Figure 2. When it is desired to move the arm 34 to the dotted or inoperative position, the operator removes bolt 40 so as to permit a free hinging of the parts.

The cross bar 20 is provided adjacent each of its ends with a forwardly projecting bearing block 62 against which the arm 26 bears as the marker is being pushed across the field.

It will be noted that the marker standard 42 is made of a helical spring thus permitting it to bend in either direction as the tractor is propelled.

It is quite apparent that with this free action of standard 42 the marker arm will remain in the normal horizontal plane while the point 46 engages the ground and the spring standard 42 will be distorted sufficiently to avoid any objectionable tension against the marker arm but will at all times hold the point 46 in contact with the ground surface. As shown in Figure 1, it will be noted that as the tractor is driven in the direction indicated by the arrow the spring standard 42 will drag rearwardly due to the ground resistance.

Referring to Figure 7 it will be noted that as the operator drives the tractor in the direction of the arrow along mark 54 the marker point will be forming the mark 56. When the tractor reaches the position shown in solid lines and the operator turns the steerable wheels by means of the usual steering wheel to make a sharp turn to the right, the marker will be forced outwardly to describe a path 58 and the steerable wheels 14 will pass beneath marker arm 26 as the tractor takes the position over mark 56. Then the marker will describe a guide line 60 so that as the other end of the field is reached and the operator turns the tractor sharply to the left the marker will describe a path similar to that shown at 58, thus making it possible to move the line successively across the field in one direction over the unplanted portion. The tractor 10 is adapted to draw a farm implement such as the planter and in the present instance, the spacings of the rows are such that the planter would be of the two row type. However, by simply lengthening the marker arm a four row planter might be used and the operation would be substantially identical.

When the tractor is being moved to and from the field the marker is positioned as shown in dotted lines in Figure 2 so that arm 34 with attached parts will be positioned above the front portion of the tractor to permit free passage of the tractor over the usual paths of travel.

I claim:

1. The combination with a farm tractor, having a frame and a front steerable wheel disposed at the front of the tractor and on the medial line thereof, of a marker arm pivoted at one end on said frame substantially on said medial line adjacent and above said wheel for limited horizontal movement, a depending ground engaging marker member carried by the other end of said marker arm, and stops carried by said frame on opposite sides of said medial line to limit the rearward movement of said arm to dispose the marker arm in either of two operative positions on opposite sides of said tractor, whereby when said tractor in reversing its direction of travel is turned toward the side on which said marker arm is then disposed the marker arm will be automatically moved from an operative position on one side of the tractor to the operative position on the other side of said tractor.

2. The combination with a farm tractor, having a frame and a front steerable wheel disposed at the front of the tractor and on the medial line thereof, of a marker arm pivoted at one end in vertically spaced-apart bearings carried on said frame substantially on said medial line adjacent and above said wheel for limited horizontal movement, a depending ground engaging marker member carried by the other end of said marker arm, and stops carried by said frame on opposite sides of said medial line to limit the rearward movement of said arm to dispose the marker arm in either of two operative positions on opposite sides of said tractor, whereby when said tractor in reversing its direction of travel is turned toward the side on which said marker arm is then disposed the marker arm will be automatically moved from an operative position on one side of the tractor to the operative position on the other side of said tractor.

MURDOCK R. HUDSON.

REFERENCES CITED

The following references are of record in the file of this patent:

UNITED STATES PATENTS

| Number | Name | Date |
|---|---|---|
| Re. 7,377 | Smith | Oct. 31, 1876 |
| 180,695 | Zellers | Aug. 1, 1876 |
| 185,140 | Southard | Dec. 5, 1876 |
| 230,231 | Brown et al. | July 20, 1880 |
| 722,779 | Watson | Mar. 17, 1903 |
| 1,046,559 | Cook | Dec. 10, 1912 |
| 1,086,983 | Barry | Feb. 10, 1914 |
| 1,164,393 | Randolph | Dec. 14, 1915 |
| 1,212,412 | Smith | Jan. 16, 1917 |
| 1,215,599 | White | Feb. 13, 1917 |
| 1,293,997 | Barry | Apr. 23, 1918 |
| 1,616,099 | Williams | Feb. 1, 1927 |

FOREIGN PATENTS

| Number | Country | Date |
|---|---|---|
| 3,059/27 | Australia | Aug. 1, 1927 |